A. McWHORTER.
POTATO PLANTER.
APPLICATION FILED MAY 31, 1918.

1,287,601.

Patented Dec. 10, 1918.
5 SHEETS—SHEET 1.

INVENTOR
Allen McWhorter
BY Diederhein + Fairbanks
ATTORNEYS

A. McWHORTER.
POTATO PLANTER.
APPLICATION FILED MAY 31, 1918.

1,287,601.

Patented Dec. 10, 1918.
5 SHEETS—SHEET 2.

INVENTOR.
Allen McWhorter.
BY
Diedersheim & Fairbanks
ATTORNEYS.

A. McWHORTER.
POTATO PLANTER.
APPLICATION FILED MAY 31, 1918.
1,287,601.
Patented Dec. 10, 1918.
5 SHEETS—SHEET 3.
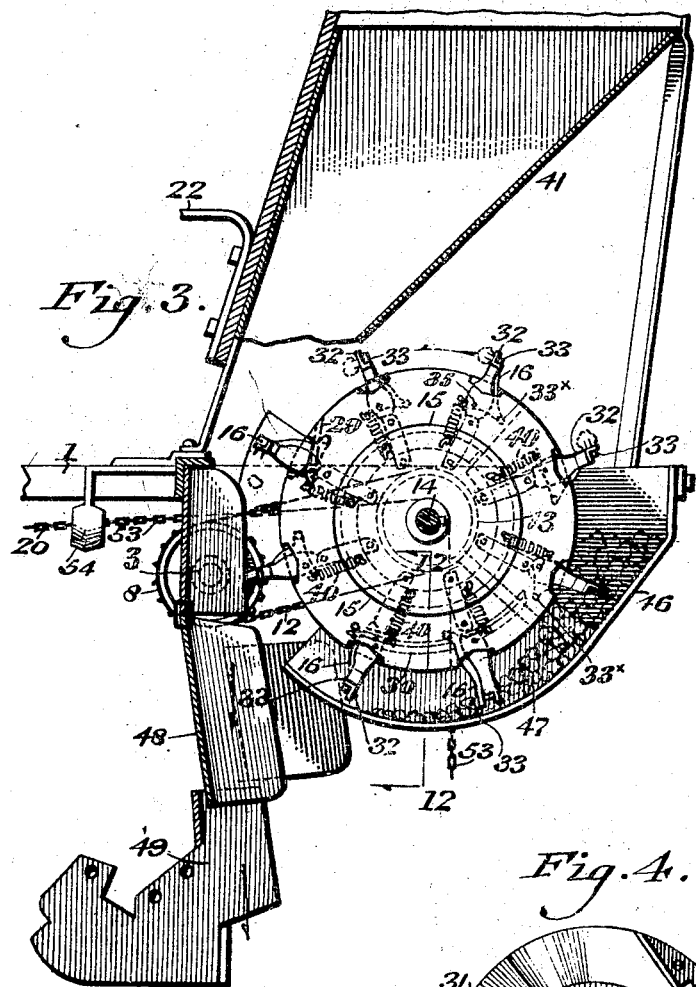
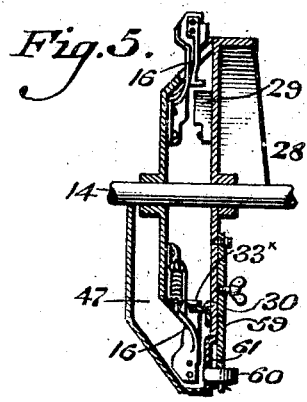
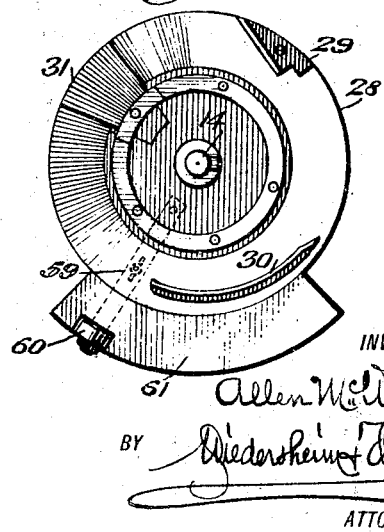
INVENTOR
Allen McWhorter
BY
Wiedersheim & Fairbanks
ATTORNEYS

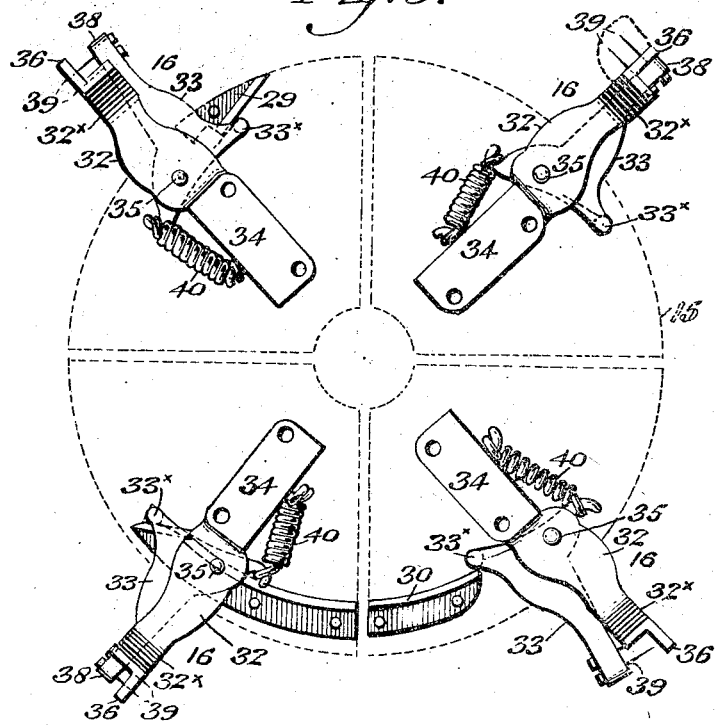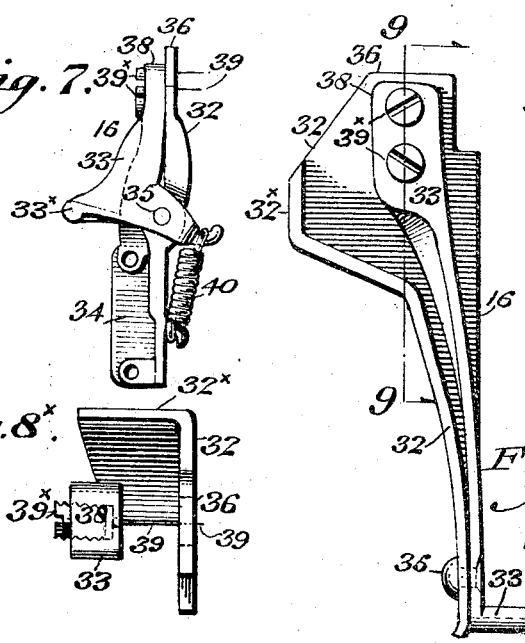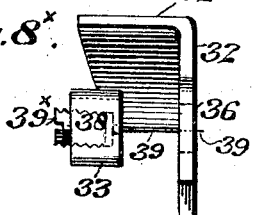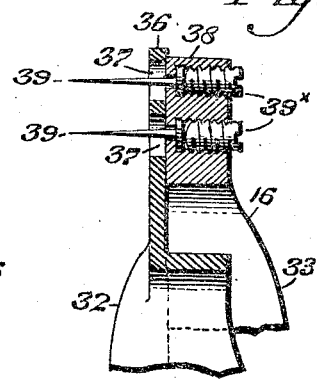

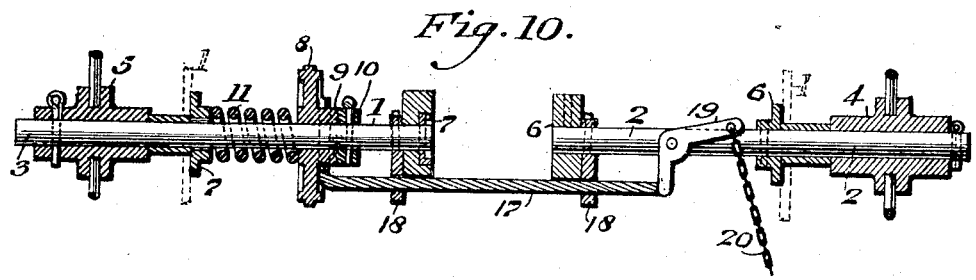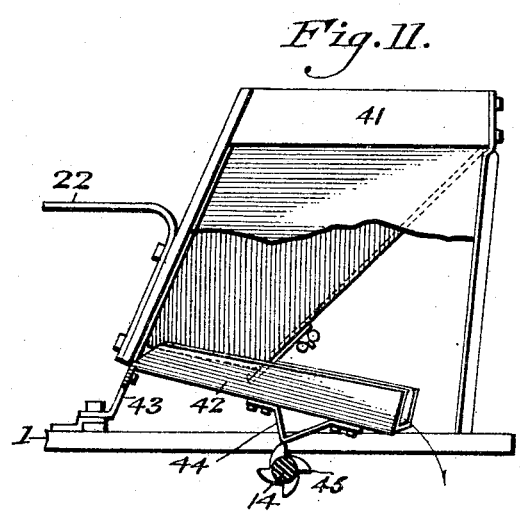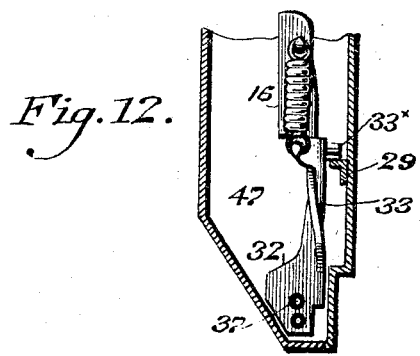

UNITED STATES PATENT OFFICE.

ALLEN McWHORTER, OF RIVERTON, NEW JERSEY, ASSIGNOR TO McWHORTER MANUFACTURING COMPANY, A CORPORATION OF NEW JERSEY.

POTATO-PLANTER.

1,287,601. Specification of Letters Patent. Patented Dec. 10, 1918.

Application filed May 31, 1918. Serial No. 237,391.

*To all whom it may concern:*

Be it known that I, ALLEN McWHORTER, a citizen of the United States, residing at Riverton, in the county of Burlington, State of New Jersey, have invented a new and useful Potato-Planter, of which the following is a specification.

My invention consists of a potato planter provided with a rotatable device which is adapted to operate at intervals to impale potatoes and release the same so that they are dropped uniformly and regularly to the ground, provision being made for rendering the impaling mechanism inoperative so as to stop the planting, and other features presented as will be hereinafter set forth.

The invention is satisfactorily illustrated in the accompanying drawing, but the important instrumentalities thereof may be varied, and so it is to be understood that the invention is not limited to the specific details shown and described as long as they are within the spirit or scope of the claims.

Fig. 3 represents a vertical section of a portion.

Fig. 4 represents a view of the interior of a stationary head member employed. Fig. 5 represents a diametrical section of the complete head member of the planter.

Fig. 6 represents a side elevation of the potato-picker mechanism employed, the carrying head thereof being shown broken so as to occupy less space on the sheet.

Fig. 7 represents a side elevation of a member of said mechanism opposite to what is shown in Fig. 6.

Fig. 8 represents a side elevation of a member of said mechanism at a right angle to Fig. 7, on an enlarged scale. Fig. 8ˣ represents an end view of a portion of Fig. 8.

Fig. 9 represents a longitudinal section of a portion on line 9—9 Fig. 8.

Fig. 10 represents a longitudinal section of part of the running gear of the planter, and mechanism for throwing a certain sprocket wheel employed in and out of operation.

Fig. 11 represents a vertical section of the feed hopper of the device.

Figure 1:
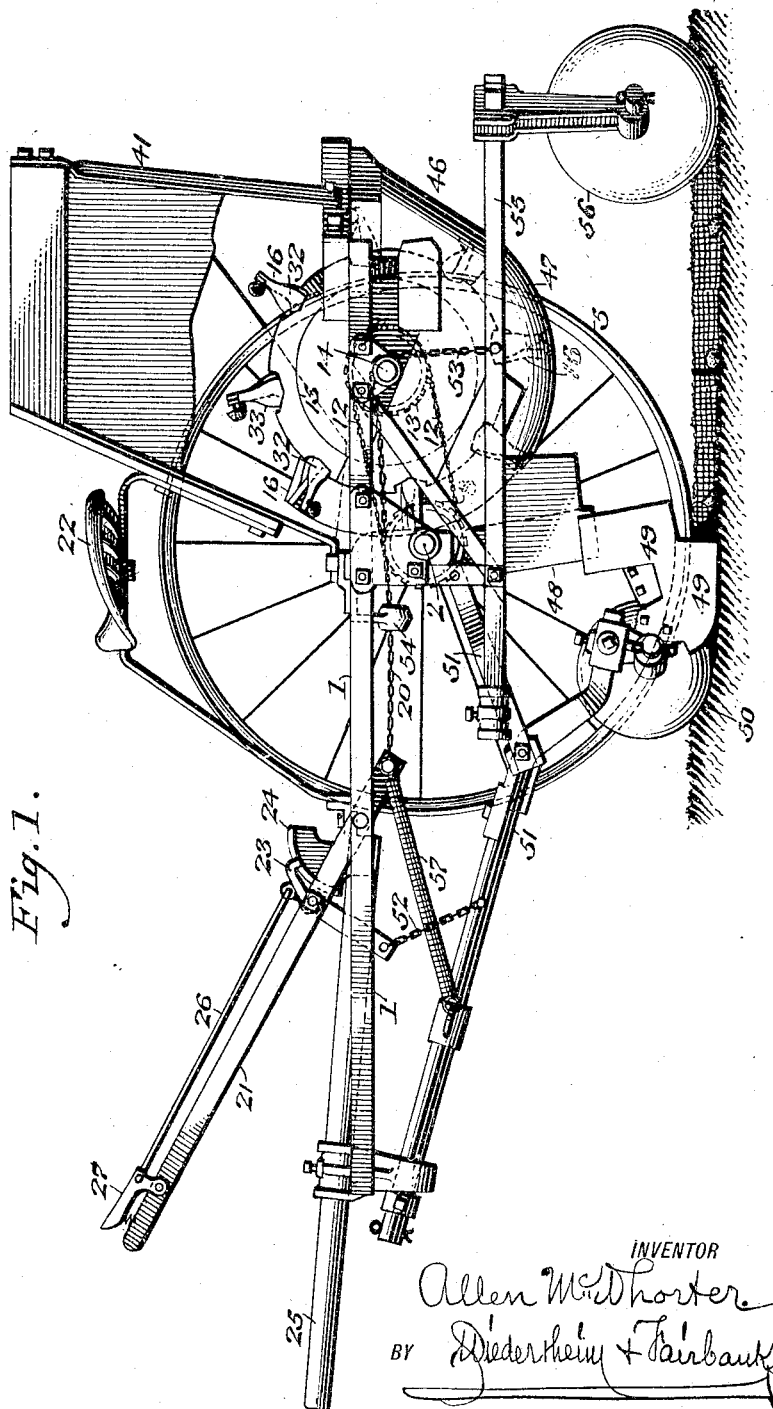
Figure 1 represents a side elevation of a potato planter embodying my invention.

Fig. 12 represents a side elevation of the picker mechanism, and a section of the surrounding chamber on line 12—12 Fig. 5. Similar numerals of reference indicate corresponding parts in the figures. Referring to the drawings.

1 designates the frame of the planter, and 2 and 3 designate divided axles for the wheels 4 and 5 on which the planter is adapted to run. The axle 2 is held stationarily in its bearings 6, and the wheel 5 is loosely mounted and rotatable thereon, see Fig. 10.

Figure 2:
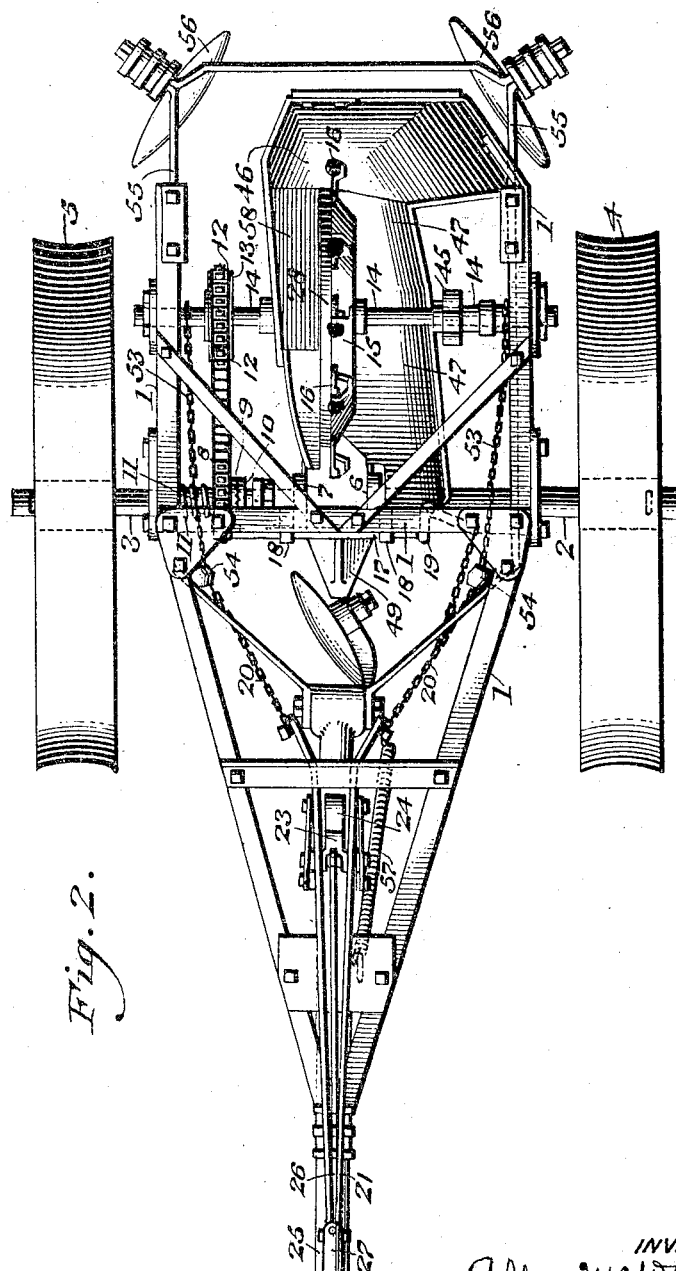
Fig. 2 represents a top or plan view thereof.

The axle 3 is rotatable on its bearings 7, and the wheel 5 is secured thereto so as to be rotatable therewith. On said axle 3 is loosely mounted the sprocket wheel 8 which is also slidable thereon, its hub 9 being adapted to interlock with the clutch member 10 which is secured to said wheel. On the axle 3 is the spring 11 which is adapted to hold the sprocket wheel 8 in engagement with said clutch member 10, whereby as the axle 3 is rotated by the wheel 5, the clutch is also rotated, and with it the sprocket wheel 8 around which latter, as best shown in Fig. 2, passes the sprocket chain 12, which also passes around the sprocket wheel 13 on the transversely extending shaft 14 which is mounted on the frame of the planter, said shaft having secured to it the concave or chambered head 15 by which it was rotated, said head having mounted on it the series of potato picking devices 16 as will be hereinafter more fully described.

In order to release the sprocket wheel 8 from engagement with the clutch member 9, I employ the rod 17 which passes freely through the brackets 18 which depend loosely from the divided axle 2, and has one end adapted to bear against the side of said sprocket wheel 8, and has its other end pivotally connected with a limb of an elbow lever 19 which is pivotally mounted on the adjacent portion of the stationary member of the divided axle 2, in the present case, the one on the right side of Fig. 10, the other limb of said lever having connected with it the chain 20 which is connected with the lower end of the lever 21 which is mounted on the frame of the planter in front of the driver's seat 22, the latter having thereon the pivotal dog 23 whose nose is adapted to engage with the notched periphery of the sector 24 of the draft pole 25, of the planter, said dog being adapted to be operated by the rod 26 and the hand lever 27 on the lever 21.

On the side of the rotating head 15 is the stationary head 28 which is freely fitted on the shaft 14, and secured firmly to the adjacent portion of the frame 1, said head 28 having on its inner face the cams 29 and 30 for engagement with members of the picker devices 16, as will be hereinafter more fully described.

The peripheral portion of said head 28 is removable forming the gate 31 which is adapted to allow access to the space between the heads 28 and 15 and to the picker devices for any purpose requiring the latter, and for relieving said space should it be clogged with potatoes.

The picking devices of which there are several properly spaced apart on the head 15, see Fig. 6, consist each of the arms 32 and 33, the arm 32 having on its inner end the shank 34 which is connected firmly with the side of said head 15. The arm 33 is pivotally connected at its inner end as at 35 with the adjacent portion of the arm 32.

In the head 36 of the arm 32 are openings 37 and on the head 38 of the arm 33 are the impelling pins 39 which project therefrom and are of such length as to pass freely through said openings 37 and protrude therefrom, see more particularly Fig. 9.

In order to hold the heads of said arms in closed position there are connected with the latter, the spring 40, it being noticed that the heads of the arms extend beyond the peripheries of the heads 15 and 28, as most plainly shown in Figs. 1, 2, and 3.

Above the picking device is the supply or feed hopper 41 having at the bottom its outlet, below which is the inclined chute or trough 42 which is connected by the resilient arm 43 with the adjacent portion of the frame 1, so that said chute may be oscillated and cause potatoes dropping into the same from the hopper to be agitated and so prevented from clogging, the potatoes then being adapted to drop therefrom at its discharge end, as shown by the arrow Fig. 11. In order to agitate said chute there is connected with the underside thereof the tappet 44 which is engaged at intervals by the toothed cam wheel 45 which latter is mounted on the shaft 14 and receives motion therefrom, the effect of which is evident.

On the pivotal end of each arm 33 of the picker device is the foot 33× which is adapted to engage the cams 29 and 30 at intervals for a purpose to be hereinafter explained.

The discharge end of the shaking chute 42 is over the potato distributing chamber 46 which is secured to the adjacent portion of the frame 1 and consists of a sufficiently deep pan-like member closed on the bottom and adapted to receive the potatoes and has a forward extension 47 which narrows toward its bottom as most clearly seen in Fig. 5, which is also occupied by potatoes, as most clearly seen in Fig. 3, into which extension the head portions of the pickers are adapted to enter, the entrance end of said extension being toward the front of the machine, as will be evident on again referring to Fig. 3.

In front of the picker mechanism is the discharge chute 48 on the base of which is the furrow spreading shoe 49 which with said chute are open throughout from top to bottom.

On the sides of said shoe are the furrowers 50 which are connected with the toggle levers 51, the rear limb of each of which is pivotally connected with the frame 1, and the front limb of which is pivotally connected with the lever 21 by the flexible members 52 whereby by operating said lever 21, said furrowers may be raised and lowered.

Connected with the chains 20 are the chains 53 which pass over guide pulleys 54 on the frame and are also connected with the beams 55 which are mounted on the frame 1 and carry the coverers 56 at the rear of the planter, whereby said coverers may be raised and lowered.

The lever 21 and the front limb of the toggle lever 51 have connected with them the spring 57 so as to exert yielding downward pressure on the furrowers 50.

It will be seen that when the hopper is supplied with potatoes to be planted and the device is drawn forward the potatoes drop from the hopper upon the chute 42, and the latter is agitated whereby the potatoes roll down the same and escape therefrom dropping into the chamber 46 and extension 47. The head 15 revolves and the heads of the picker devices in open condition pass through said extension and impact against the potatoes in the path of the same and press the same through said extension into the chamber 46.

It will here be noticed that when the foot 33× of a picker device reaches the beginning of the cam 30 it rides thereon and so opens the heads thereon and drawing in the pins 39. Then said heads ride through the extension 47 of the chamber 46, as shown at the bottom of Fig. 3. Then when the foot clears the terminal of said cam 30, it trips off of the same, and the heads of the picker device enter said chamber 46. Then the spring 40 is operative so as to close said heads whereby the pins 39 are caused to protrude beyond the head of the arm 32 of the picker device as shown in Fig. 9, and as shown in the chamber 46, Fig. 3, the motion of the pins being forcible whereby they are impelled into an impacting potato in front of the head 36 and so take firm hold of the same. Then as the head 15 rotates which is in the direction of the arrow Fig. 3, the impaled potato is carried upward and toward the front of the planter, the foot 33ˣ engages the cam 29 and so moves the arm 33, whereby its head recedes from the head 36 of the arm 32, thus withdrawing the pins 39 through the openings 37 of said head 36, the latter then acting as a wiper which strips the potato from said head 36, when as the potato is no longer held by the pins it drops and is directed into the chute 48 from thence into the shoe 49 and so into the furrow below the latter. Then the foot 33ˣ leaves the cam 29 and the spring 40 is operative, thus closing the head of the arm 32 against the head of the arm 33, whereby the pins 39 again protrude from the head 36. As the head 15 continues its rotation the heads of the picker device enter the extension 47, see Fig. 3, and the foot thereof engages the beginning of the cam 30, thus again opening the heads of the picker device, and drawing in the pins 36, said heads then riding through said extension and the operations thereafter as hereinbefore recited are repeated.

Should potatoes prematurely drop from the impaling pins after carried over the chamber 46 they may fall into the trough 58 which is disposed on the side of the head 28 at what may be the base portions of the latter, said trough being secured to the frame and inclined toward the distributing chamber and so said potatoes will roll back into the same, or some of the potatoes may drop back into the chamber 46, or sidewise over the head 15 into the forward extension 47 of said chamber, see Fig. 2.

Connected with the stationary head 28 is the arm 59 on whose outer end is mounted the friction rollers 60 which is adapted to protrude through the lower wall 61 of said stationary head 12, see Figs. 4 and 5, and enter the lower portion of the chamber 47 so as to rotate in contact with potatoes in the latter, thus keeping the potatoes rolling in the chamber and preventing them from clogging or packing therein.

On the side of the head 36 of the arm 32 is the laterally-extending elbow 32ˣ which is adapted to overhang freely the head 38 of the arm 33, so that when said heads are separated while in the distributing chamber 46, as shown more particularly in Fig. 8ˣ, the potatoes on said chamber adjacent to said elbows will be deflected over said elbow and so prevented from entering the space between said heads and clogging the latter, which otherwise would prevent the closing of said heads and the operation of the impaling pins 39. It is evident that the potatoes in front of the head 36 in the chamber 47 are pressed against said head by the weight of the mass of potatoes, and so the potatoes immediately contacting with said head are held firmly thereon so that the pins will properly pierce and impale said potatoes.

In the heads of the arms 3 are threaded openings to receive the threaded studs or screws 39ˣ, which latter carry the impaling pins and sustain the same and admit also of the adjustment of said pins in the direction of their length.

What I claim as new and desire to secure by Letters Patent, is:—

1. In a potato planter, a pair of arms one stationary and one pivotal, a rotatable head on which said arms are mounted, a pivot for the pivotal arm, an impaling pin on the pivotal arm movable through an opening in the stationary arm, said opening acting as a wiper for said impaling pin to remove the potato therefrom, and means for operating the pivotal arm in both directions.

2. In a potato planter, a pair of arms one stationary and one pivotal, a rotatable head on which one of said arms is stationarily mounted, a pivot for the other arm, an impaling pin on the pivoted arm movable through an opening in the other arm, said opening acting as a wiper for said impaling pin to remove the potato therefrom, means for operating the arms in opposite directions, and a foot on the pivoted arm near its pivot for coöperation with cams to actuate the movable arm.

3. In a potato planter, a pair of arms one stationary and the other movable, a rotatable head on which said arms are supported, an impaling pin on the pivoted arm movable through an opening in the other arm, said opening acting as a wiper for said impaling pin to remove the potato therefrom, and means for operating the pivoted arm in opposite directions, said stationary arm having a laterally extending elbow adapted to freely overhang the head of the pivoted arm.

4. A rotating head, two arms thereon, one movable to and from the other and having an impaling pin thereon, the latter-named arm having therethrough an opening in which said pin is adapted to play, said opening constituting a wiper for the pin.

5. In a potato planter, a potato picking device, and a rotatable head on which said device is mounted, said device consisting of arms, one of which is stationarily connected with said head, and the other arm is pivotally mounted on the stationary arm, an impaling pin on the pivotal arm, the stationary arm having therein an opening through which said pin is movable, and means for operating the pivotal mounted arm in opposite directions.

6. In a potato planter, a potato picking device, and a rotatable head on which said device is mounted, said device consisting of arms, one of which is stationarily connected with said head, and the other arm is pivotally mounted on the stationary arm, an impaling pin on the pivotal arm, the stationary arm having therein an opening through which said pin is movable, means for operating the pivotal mounted arm in opposite directions, a foot on the pivotal arm, a resilient member connected with the pivotal arm for closing the latter on the stationary arm, a stationary head on the frame of the planter, and a cam on the latter named head, said foot being adapted to engage said head for opening the pivotal arm from the stationary arm.

7. In a potato planter, a potato picker device, and a carrier therefor, said device being formed of arms, one being pivotally mounted, a cam on the planter adapted to engage the latter to separate it from the other arm, a resilient device connected with the pivotal arm, and an impaling pin on the pivotal arm, the other arm having therein an opening in which said pin may move in opposite directions, said resilient device being adapted to close the pivotal arm on the stationary arm to forcibly impel said pin through said opening.

8. In a potato planter, a potato-distributing chamber, a potato picker device adapted to traverse said chamber, said chamber having an extension at its forward lower end, said extension being narrowed toward its bottom to contract the passage and to receive the potatoes and also to receive the head portions of the pickers, and a trough to receive the potatoes from the picker device, said trough being disposed adjacent the end of said extension.

9. In a potato planter, a potato picking device, a rotatable head on which said device is mounted, a stationary head at the side of said rotatable head, said device consisting of arms, one of which is pivotally connected with the other arm, a resilient device connected with the pivotal arm for closing it on the stationary arm, an impaling pin on the pivotal arm, the stationary arm having therein an opening in which said pin may move in opposite directions, a foot-piece on said pivotal arm, and a plurality of cams on said stationary head, said foot piece being adapted to engage said cams in succession.

10. In a potato planter, a rotatable head, a potato picker device thereon, a pivotal distributing chamber which said device is adapted to traverse and to impale a potato therein, and a roller-like device adapted to enter said chamber and engage the potatoes therein to keep them in movement against clogging or packing.

11. In a potato planter, a supply hopper, a trough at the discharge end of said hopper, a potato distributing chamber adjacent to the terminal of said trough, a potato picker device in said chamber, a tappet on said trough, and a cam-like member adapted to engage said tappet.

12. A potato picker device having heads movable with relation to each other, and an elbow carried by one of said heads to deflect the potatoes to prevent their entering the space between said heads.

ALLEN McWHORTER.

Witnesses:
JOHN A. WIEDERSHEIM,
N. BUSSINGER.

Copies of this patent may be obtained for five cents each, by addressing the "Commissioner of Patents, Washington, D. C."